T. B. SLATE.
BALL BEARING.
APPLICATION FILED MAY 27, 1916.
1,209,772.
Patented Dec. 26, 1916.
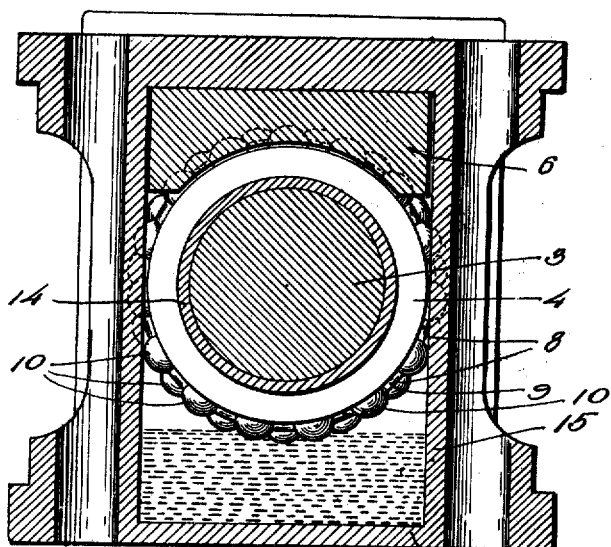
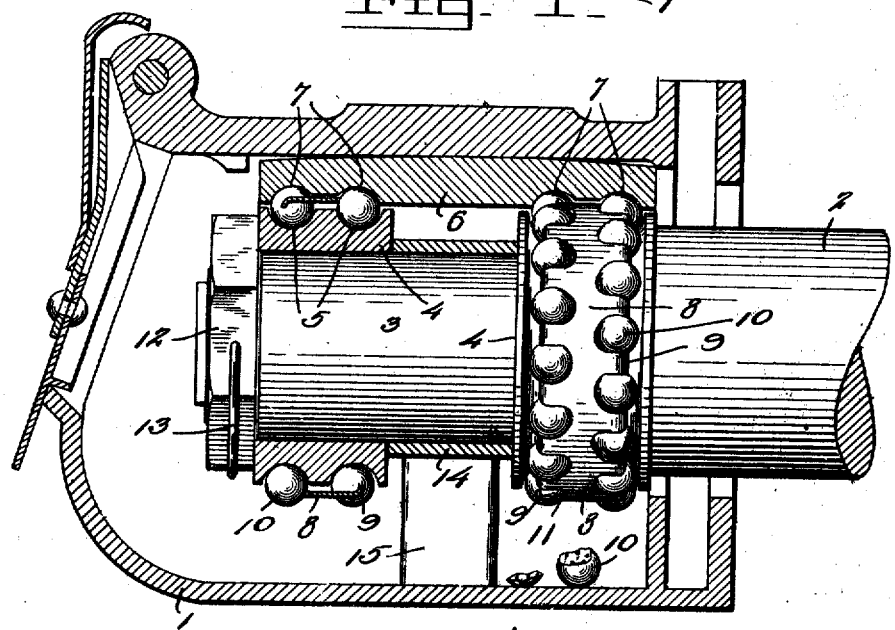
Witnesses
Inventor
T. B. Slate,
Jerry A. Mathews
Attorney

UNITED STATES PATENT OFFICE.

THOMAS B. SLATE, OF WASHINGTON, DISTRICT OF COLUMBIA.

BALL-BEARING.

1,209,772.  Specification of Letters Patent.  Patented Dec. 26, 1916.

Application filed May 27, 1916. Serial No. 100,287.

*To all whom it may concern:*

Be it known that I, THOMAS B. SLATE, a citizen of the United States, and resident of Washington, in the District of Columbia, have invented a new and useful Ball-Bearing, of which the following is a specification.

The main objects of my invention are to provide novel means for holding balls without the use of ring bearings; to provide novel means for their insertion in and removal from the device; to provide a novel load-bearing member designed to equalize the load and carry excessive end thrust; and to provide an outer bearing member that can be easily and readily removed and replaced by a new one, to permit of regrinding the ball races in said bearing member.

It is also an especial object to provide novel means for freeing the bearing of all foreign substance or broken parts which otherwise would cause injury to the bearing which might result in serious accidents should it happen while a train of cars were being moved at high speed.

It is further an object of my invention to provide a novel ball bearing device arranged to carry the balls into the oil contained in the lower portion of the journal box rendering it unnecessary to use an absorbent substance for the purpose of conducting oil up to the journal.

It is also an object to reduce the size of the spindle or axle end and to position same within the journal casing so that the ball members will reach the oil level as the outer circumference of the balls pass below the axle opening in end of journal box.

I attain the objects of my invention by the mechanism illustrated in the accompanying drawings, in which—

Figure 1 is a sectional view through the end of a car journal to which my invention has been applied; and Fig. 2 is a view partly in section and partly in elevation longitudinally of a car journal to which my invention has been applied.

Like numerals designate like parts throughout the views.
Referring to the accompanying drawings, I provide a railroad car journal box of usual construction, in which is mounted the usual axle having a suitable journal or spindle 3, upon which are mounted suitable bearings 4 provided with ball races 5. In opposed relation to the upper portions of inside bearings 4, I provide a novel outer bearing 6 having ball races 7, member 6 being positioned between the top of journal box 1 and journal 3, as shown. I provide a novel ball container 8, having inwardly curved flanges 9 engaging balls 10. Flanges 9 are arranged in staggered relation in order to better equalize load conditions and to give greater strength to the ball container 8 between its openings 11. A suitable nut 12 of usual construction, provided with a locking device 13 holds the bearings in position. In order to space bearings 4 the proper distance apart on journal 3 I provide a suitable spacer 14. A suitable journal box guide member 15 of usual construction holds the bearing cap or outer bearing 6 in position.

The ordinary type of car journal bearing of the friction type, which is in general use at the present time on railroad cars creates a great amount of friction, thereby utilizing a large percentage of the power required to move a train of cars. I have designed a ball bearing especially adapted for use on railroad cars or wherever the outside bearing is stationary and carrying a load in a perpendicular direction.

My bearing is designed to carry the large amount of end thrust to which a car journal bearing is subject when the car is being rapidly moved around curves on the track. This is accomplished by the novel outer bearing cap 6 which passes only a portion of the way around the car journal, covering that portion of the journal subject to the pressure of the weight of the car and allowing the balls to travel the remainder of the distance around the journal, held in place by the container 8. In consequence any foreign substance, such as sand or grit, that may get into the journal box or bearings is allowed to drop off or be thrown off by centrifugal force or washed off by the dipping of the balls in the oil contained in the bottom of the journal box 1. The construction shown also allows any small fragment of a broken ball to drop out in the same manner and if this fragment should be sufficient to render the ball a detriment to the bearing it will be sufficient to allow the ball to drop out as is illustrated by the broken ball 10 in Fig. 2, the opening which it had occupied in container 8 being left vacant.

Inside bearings 4 have ball races 5 and outer bearing 6 has ball races 7 arranged as shown, the ball races or grooves 5 in member 4 being spaced a little farther apart than the corresponding grooves or ball races 7 in member 6. The object of this positioning of the ball races relative to each other is to cause the balls to automatically find their seat to balance the load and to carry end thrust. By using this particular design of outer bearing 6 it is possible to have deep grooves or ball races, allowing opposed shoulders of the respective ball races 7 and 5 to extend farther around the balls for the purpose of providing additional bearing surface and end thrust capacity. In other words, the balls are diagonally engaged by the shoulders of the respective ball races of the outer and inner bearings. My construction permits tilting of member 6. The design of outer bearing 6 disclosed also makes it possible to space the balls closely together in the bearing, giving a greater number of balls in a given amount of space. Member 6 also is designed to fit in the same space now occupied by the top plate of the present type of friction bearing now in common use, the main object of this being to save the expense of having to change or especially design a journal box for this bearing. Further, I have provided means for removing and replacing damaged balls in the least possible time. This is accomplished by my novel ball container 8 which is made of spring steel and provided with inwardly curved staggered flanges 9 which can be sprung sufficiently to allow a ball to be pressed into position in the container 8 or removed from the container. This may be done without lifting the weight of the car from the journal at any time when the ball is not under the upper bearing 6, and those under member 6 may be shifted by merely rolling the car in either direction on the track until the ball desired to be removed or replaced rolls from under member 6 to a convenient position for removal. This bearing is designed throughout to permit of its removal from the journal without having to remove the journal box 1. Further, I reduce the diameter of journal 3 as compared with those now in use, as the strength of the journal is greater than that necessary to carry the load for the purpose of getting sufficient bearing surface by the old method of friction bearings, and also because the type now in use has to be of additional strength on account of the fact that the bearings occasionally become heated to that extent that it would greatly reduce the carrying capacity of the journal. Such additional strength is unnecessary with a ball bearing because of the fact that they are not nearly so apt to become heated by friction. The main object of the reduction of the size of the journal is for the purpose of using or bringing back into use discarded car axles that have been removed from use because of the fact that the journal bearing had become worn to the extent that it could no longer be used with the friction type of bearing. Axles equipped with my ball bearing will not be similarly subject to removal because of the fact that there is no appreciable wear on the journal, the wear all being taken care of by the balls and their respective races.

It is within the contemplation of my invention to apply my ball bearings to machinery other than railroad cars.

What I claim is:

1. In a device of the class described, the combination of an inner bearing member having ball grooves, an outer grooved bearing member positioned to engage over the portion of the journal subject to load pressure, a ball container consisting of a ring having inwardly curved flanges arranged in staggered relation to engage around an outer portion of the balls, spaced balls retained in position by the container during the time that the balls are out of engagement with the outer bearing member, as and for the purposes described.

2. In a device of the class described, the combination of an inner bearing member having a plurality of ball grooves, an outer bearing member extending only over the upper portion of the inner bearing member and having a plurality of corresponding ball grooves, the ball grooves in the upper bearing member being spaced slightly less distant from each other than the opposed grooves in the inner bearing member to permit of a tilting movement of the upper bearing member without interfering with the operation of the ball bearing, a ball container ring engaging over the outer portions of balls to hold same in position when out of engagement with the outer bearing member, and a plurality of balls mounted in spaced relation in the container.

3. In a device of the class described, the combination of a journal box, a journal, grooved bearing members mounted in spaced relation on the journal, an upper grooved bearing member mounted over and in spaced relation to the first mentioned grooved bearing members, a ring-shaped ball container having inwardly curved ends engaging over the outer portions of the respective balls to retain same in position when out of engagement with the upper bearing member the balls being positioned at their lowest station in the container to dip in oil carried in the journal box, and a plurality of balls in the container, substantially as described.

4. In a device of the class described, the combination of a journal box, a journal, bearing rings having a plurality of ball races the bearing members being mounted in spaced relation to each other, a journal, a load-supporting bearing member extending over only the upper portion of the bearing rings, a ball container consisting of a ring having staggered openings therein to receive the balls and having inwardly curved flanges to engage the outer portions of the balls to retain same in operative position and to permit of the dropping of any broken balls to the bottom of the journal box, and a plurality of balls for each ball race engaged by the container, substantially as and for the purposes described.

5. In a device of the class described, the combination of an inner bearing member having ball grooves, an outer grooved bearing member positioned to engage and extending only over the portion of the journal subject to load pressure, a ball container consisting of a ring having ball engaging flanges supporting the balls in engagement with the inner bearing member the flanges being disposed in staggered relation, balls in the container, and means retaining the outer bearing member against longitudinal movement, substantially as shown.

THOMAS B. SLATE.

Witness:
LESTER L. SARGENT.